United States Patent Office 3,483,155
Patented Dec. 9, 1969

3,483,155
EMULSION POLYMERIZATION OF N-ALKYL AMIC ACID AND ALKYL ACRYLATES OR ALKYL METHACRYLATES
Carlos M. Samour, Wellesley Hills, Mass., assignor to The Kendall Company, Boston, Mass., a corporation of Massachusetts
No Drawing. Filed Nov. 7, 1966, Ser. No. 592,274
Int. Cl. C08f 15/40
U.S. Cl. 260—29.6       13 Claims

ABSTRACT OF THE DISCLOSURE

Polymers comprising N-alkyl amic acid and alkyl acrylate and/or alkyl methacrylate comonomers are prepared in accordance with an aqueous emulsion polymerization system wherein at least a portion of the amic acid is present in the form of a salt. The amic acid salt is polymerically combined as a comonomer in the polymer dispersed in the reaction mixture. Conversion of the salt to its acid form results in coagulation of the polymer.

---

This invention relates to an improved emulsion polymerization process. The invention also relates to improved polymer dispersions or emulsions produced by the process and the utilization of the same.

Emulsion polymerization is a well known technique for polymerizing ethylenically unsaturated monomers capable of addition polymerization. In this technique of polymerization, the monomer or mixture of monomers are subjected to polymerization conditions while dispersed as emulsion droplets in an aqueous medium. The reaction mixture is agitated, simple stirring is often sufficient, to disperse the water insoluble monomeric constituents in the form of emulsion droplets in the aqueous medium. An essential ingredient is an emulsifying agent which aids in the formation and stabilization of the monomer droplets in the emulsion. For this purpose, surface active agents such as soaps or detergents are widely employed. Desirably, the emulsifying agent is such to also aid in the stabilization of the polymer dispersion produced.

It is difficult to separate the emulsifier from the resultant polymer. Herein lies one of the major drawbacks of emulsion polymerization. The emulsifier may have a contaminating influence on the properties of the polymer for some applications. For example, coatings of the polymer prepared directly from the dispersion of the polymer or polymer latex are limited to applications where the presence of the emulsifier is not considered deleterious. Furthermore, undesirable amounts of water may be entrapped in the polymer coagulum and present difficulties in subsequent processing of the polymer.

It has been suggested that these and other disadvantages of aqueous emulsion polymerization processes be overcome by the use of decomposable or "fugitive" emulsifiers. The emulsifiers are compounds which can be converted under proper conditions to a state in which they are not emulsifiers. The converted compound remains in the coagulated reaction mixture as an ingredient foreign to the polymer and may be difficult to remove from the polymer coagulum.

This invention is directed to an aqueous emulsion polymerization process in which the emulsifying constituents in the reaction mixture enter into the reaction, thereby becoming polymerically combined in the polymer. The polymer, which as produced may be dispersed in the reaction medium in the form of a polymer latex, subsequently may be treated to convert aforementioned polymerically combined constituents to a form in which they do not exhibit emulsifier properties. In general, the present process is directed to an emulsion polymerization process in which at least part of the monomer charge is a mixture of certain esters and salts of certain ethylenically unsaturated carboxylic acid monomers capable of addition polymerization. The salt of the carboxylic acid monomeric constituent may be formed by reaction with a base in the aqueous reaction medium. Simple agitation of the mixture of the monomers in the water results in the formation of an emulsion when the carboxylic acid monomers or a portion thereof is present in the salt form.

The emulsion provides an excellent medium in which the polymerization reaction can be conducted. The salt monomers are copolymerized and thus become polymerically combined in the polymer. The polymer containing the ester and salt monomer as recurring units therein may be produced as a reasonably stable aqueous dispersion of the polymer, i.e., a latex. The polymer thus is "self-emulsified" since the reaction mixture and resulting latex contains no added soap or emulsifying agent. The polymer dispersion subsequently may be treated to destroy the emulsion and coagulate the polymer in either its salt form or in its free carboxylic acid form.

The polymer thus may be produced without the aid of external emulsifiers. The polymer may be separated from the aqueous reaction medium as a coagulum free from added emulsifying agents. The coagulated polymer need not be subjected to additional treatments, such as leaching with water, to remove external emulsifier to eliminate or reduce the deleterious effects the presence of the same may have upon the properties of the polymer.

Further, it has been observed that thermoplastic polymers produced in accordance with this invention are more suitable for thermo-forming processes, e.g., a hot calendering process to form a sheet or a coating of the polymer, than the same polymer produced with the aid of an external emulsifier. Polymers made by this invention may be separated from the dispersion with less entrapped water in the coagulum and/or more easily dried to remove water from the coagulum than polymers produced with the aid of an external emulsifier.

This invention provides a further and distinct advantage in the production of solutions of the polymer in suitable solvents therefor directly from the polymer dispersion. The carboxylate salt groupings of the polymer in the dispersion may be converted to their corresponding free carboxylic acid form and the converted polymer directly transferred to a solvent to form a solution thereof without intermediate steps to separate the polymer from the aqueous medium to remove emulsifier and to dissolve in the solvent. These and other advantages will be apparent to those skilled in the art from the following detailed description and discussion of the invention.

In accordance with this invention a reaction mixture is prepared containing water, a monomer charge of copolymerizable monomers capable of addition polymerization, a catalyst to initiate the addition polymerization reaction, and a base. The copolymerizable monomeric constituents essential for emulsification are (1) an ester monomeric constituent and (2) a carboxylic acid monomeric constituent, all or a part of which is in salt form. The ester monomeric constituent consists of alkyl acrylate monomers, alkyl methacrylate monomers, or mixtures thereof, in which the respective alkyl groups contain from 1 to 10 carbon atoms.

The carboxylic acid monomeric constituent consists of amic acid monomers or acid ester monomers corresponding to the formula

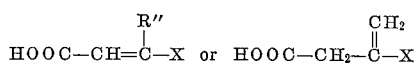

wherein X is —CONRR' in the case of amic acid monomers and either —COOR or

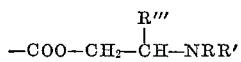

in the case of acid ester monomers. R' is either hydrogen or an alkyl group containing from 1 to 10 carbon atoms and R'' and R''' are, independently hydrogen or methyl. Further, said carboxylic acid monomeric constituent is selected from the groups of amic acid and acid ester monomers in which R is alkyl, as hereinafter defined, said groups consisting of:

(a) An individual amic monomer in which the R alkyl group contains from about 10 to 24 carbon atoms, (b) A mixture of amic acid monomers in which the number of carbon atoms in the R alkyl groups average from about 10 to 24, the amic acids of said mixture being selected from the group consisting of the amic acids containing from 1 to about 28 carbon atoms in the R alkyl groups thereof, (c) An individual acid ester monomer in which the R alkyl group contains from about 6 to 24 carbon atoms in the alkyl group, (d) A mixture of acid ester monomers in which the number of carbon atoms in the R alkyl groups average from about 6 to 24, the acid esters of said mixture being selected from the group consisting of the acid esters containing from 1 to about 24 carbon atoms in the R alkyl groups thereof, and (e) Mixtures of amic acid and acid ester monomers selected from the group consisting of mixtures of (a) and (c) groups of monomers, mixtures of (a) and (d) groups of monomers, mixtures of (b) and (c) groups of monomers and mixtures of (b) and (d) groups of monomers.

In the case of N-dialkyl amic acids of the foregoing formula wherein R' and R are both alkyl, the alkyl group containing the greater number of carbon atoms shall be the R group. Either alkyl group may be designated the R group in the case where both R' and R are alkyl groups having the same number of carbon atoms.

Monomers of the foregoing groups are the amic acids and acid esters of maleic acid, fumaric acid, citraconic acid and itaconic acid. The preferred monomers are those in which the R alkyl groups are branched.

As indicated above, all or a portion of the carboxylic acid monomeric constituent is present in the reaction mixture in the form of carboxylate salt monomers. The salt monomers conveniently are formed in the reaction mixture by the addition of the acid monomers and base to the aqueous medium of the reaction vessel. The salt monomers may also be formed separately and then added as such to the reaction vessel and this is to be considered equivalent to the process where the salt monomers are formed in the reaction vessel. In any event, sufficient salt monomer is present in the reaction mixture to produce an emulsified reaction mixture when the ester monomeric constituent is present and the mixture is agitated to disperse the monomers in the aqueous phase.

Generally, it will be found that the salt monomer in an amount of about 5% by weight of all of the copolymerizable monomers is sufficient to produce an emulsified reaction mixture upon simple agitation, as by stirring. The amount necessary for this purpose, depends upon the composition of the ester monomeric constituent, the composition of the carboxylic acid monomeric constituent, if any, present in its free acid form, the amount and nature of other copolymerizable monomers present in the reaction mixture and the composition of the salt monomer. Generally, better emulsions of the reaction mixtures and more stable polymer dispersions are obtained in the case of salts of the mixtures of the carboxylic acid monomers described in groups (b) and (d) of the Markush group set forth above. To illustrate by specific reference to maleamic acid monomers: if the object is to produce a polymer containing only a minor amount of recurring units therein corresponding to N-alkyl maleamic acid monomers, or their salts (e.g., a polymer consisting predominantly of all acrylate recurring units), then the salt form of a group (b) mixture of maleamic acids is recommended over the salt of an individual N-alkyl amic acid of group (a). Group (b) mixtures in which all or substantially all of the amic acids thereof have R-alkyl groups containing 10 and more carbon atoms are preferred over group (b) mixtures containing a larger number of amic acids having less than 10 carbon atoms in the R-alkyl groups. In the case of acid esters, the preferred mixtures encompassed by the group (d) mixtures are those containing a greater proportion of acid esters having 6 or more carbon atoms in the R-alkyl groups.

As shown in the foregoing description, the salt monomer contains a hydrophyllic, anionic carboxylate group and a hydrophobic group, the latter being the R alkyl group averaging at least about 10 carbon atoms in the case of the salt of the amic acid and at least 6 carbon atoms in the case of the acid ester monomer. Because soaps employed as emulsifying agents also may have hydrophyllic and hydrophobic groupings, one may be inclined to offer as theory that the salt form of the carboxylic monomer acts as an emulsifier and since the monomer in its free acid form can be copolymerized with various acrylate and methacrylate monomers, the salt monomers also simply enter into the reaction and copolymerize with these comonomers. However, it has been found that the success of this process requires that the above defined ester monomers and the carboxylic acid monomers, a portion or all of which is in salt form, must constitute the major proportion of the copolymerizable monomers in the reaction mixture. Thus, attempts to carry out the process of this invention were unsuccessful in which the copolymerizable monomeric constituents of the aqueous reaction medium consisted of a minor proportion of the aforedescribed ester monomers and carboxylic acid monomers and a major proportion, by weight, of a "lauryl" methacrylate or a major proportion of a "stearyl" methacrylate. However, the present process was successfully conducted, with these long chain alkyl ester monomers polymerically combined in the polymer, when small amounts of these monomers were employed, generally no more than about 20% by weight of the total monomer charge.

The aforementioned lauryl and stearyl methacrylates are esters prepared from methacrylic acid and commercially available "lauryl" alcohols and "stearyl" alcohols. The alcohols are mixtures of alkyl alcohols derived in a known manner from natural occurring fatty acids. The average number of carbon atoms in the alkyl groups of the alkyl alcohols in the instance of the lauryl alcohol is about 12 and in the instance of the stearyl alcohol is about 15.5.

The bases used in this process are those which are reactive with the carboxylic acid monomers to form the corresponding water soluble salt monomers having a hydrophyllic carboxylate salt grouping thereon. Suitable bases are monovalent inorganic and organic bases. Examples of bases, one or more of which may be employed in the process, are ammonium hydroxide (which may be provided by the addition of ammonia to the aqueous reaction mixture), water soluble alkali metal hydroxides such as sodium hydroxide and potassium hydroxide; primary, secondary and tertiary amines in which the groups attached to the amino nitrogen atom are cyclic and acyclic alkyl, hydroxyalkyl and alkyl ether groups, e.g., ethylamine, diethylamine, triethylamine, dimethylamine, trimethylamine, N,N,N',N'-tetramethyl methylene diamine, N-hexylamine, dimethylethanolamine, N-dimethylisopropanolamine and morpholine; and quaternary ammonium bases, such as benzyltrimethyl ammonium hydroxide and dodecyltrimethyl ammonium hydroxide. Bases which are water soluble are preferred.

The practice of this invention is particularly advantageous in the production of certain of the pressure adhesive polymers disclosed in pending patent applications Ser. No. 386,476, filed July 21, 1964, now U.S. Patent No. 3,299,010, and Ser. No. 592,254, filed concurrently herewith. The present process is particularly suitable for the preparation of those polymers of these pending applications which are pressure-sensitive adhesive polymers of monomers consisting essentially of about 30 to 95 parts by weight of the ester monomer as hereinbefore defined and, correspondingly, 70 to 5 parts by weight of:

(1) A mixture of amic acid monomers of the (b) group above defined in which, further, the amic acids which contain more than about 6 carbon atoms in the R alkyl groups consist essentially of amic acids in which the alkyl groups are branched alkyl groups or (2) A mixture of acid ester monomers of the (d) group above defined wherein, further, the number of carbon atoms in the R alkyl groups of the monomers average at least about 8 and the acid ester monomers in the mixture which contain more than about 6 carbon atoms in the alkyl groups consist essentially of acid esters in which said alkyl groups are branched alkyl groups.

In each case, the mixtures of monomers are liquid to semisolid viscous non-crystalline compositions. This requirement is met, as the average size of the R alkyl group increases above 6 carbon atoms, by increasing the extent of branching in the R alkyl groups of the individual monomers and by increasing the number of monomers in the mixtures containing dissimilar R alkyl groups as the average number of the carbon atoms in the R groups of the mixture increases above 10 carbon atoms, all as taught in said pending applications. In the production of the adhesive polymers, the monomeric constituents are copolymerized with the weight proportions stated, but not to exceed a mol ratio of 1:1.

The carboxylic acid monomer "N-t-$C_{12}$ maleamic acid" in the following examples is a mixture of maleamic acid monomers prepared by the amidation of maleic anhydride with a complex mixture of t-alkyl primary amines marketed by The Rohm and Haas Company. The t-alkyl groups are highly branched alkyl groups. Primene 81–R is one of a series of t-alkyl amines marketed by this company containing such amines as t-butyl amine; 1,1,3,3-tetramethylbutyl amine; 1,1,3,3,5,5 - hexamethylhexyl amine, 1,1,3,3,5,5,7,7-octamethyloctyl amine; 1,1,3,3,5,5,7,7,9,9-decamethyldecyl amine; and 1,1,3,3,5,5,7,7,9,9,11,11-dodecamethyldodecyl amine. Primene 81–R consists principally (90%) of $C_{11}$ to $C_{14}$ branched alkyl amines. The neutral equivalent of Primene 81–R is 191 corresponding to an alkyl amine having an average alkyl group of about 12 carbon atoms.

EXAMPLE 1

Polymerization:                                    Parts, gms.
  (1) Distilled water _____  400
  (2) Concentrated ammonium hydroxide ____   23
  (3) N-t-$C_{12}$ maleamic acid _____  57.8
  (4) Ethyl acrylate _____  20.0
  (5) 2-ethylhexyl acrylate _____ 147.2
  (6) Ammonium persulfate _____  0.35
  (7) Ferrous ammonium sulfate _____  0.02
  (8) Ascorbic acid _____  0.3

The water and ammonium hydroxide were placed in a reaction vessel, previously flushed with nitrogen and suitably equipped with a stirrer, thermometer and buret. The maleamic acid and acrylates were then added while vigorously stirring the mixture. The pH of the resulting emulsion was about 8.0, as measured by pHydrion paper. The emulsion was cooled to about 10° C. by placing the reaction vessel in an ice bath and 0.25 gm. of the ammonium persulfate was added, followed by the addition of about 10–20 drops of a solution of the ferrous ammonium sulfate and ascorbic acid in about 10 ml. of water. The temperature of the reaction mixture rose to about 37° C. The temperature was then permitted to drop to 25° C. with continued cooling of the reaction mixture, after which the ice bath was removed and 0.1 gm. of the persulfate initiator was added followed by the addition of an additional 10–20 drops of the solution of the reducing system.

The reaction was quite rapid. A translucent emulsion was obtained within minutes after polymerization began. The emulsion of the amic acid ammonium salt:acrylate polymer was gently stirred for about one hour. Pressure-sensitive adhesive tapes may be prepared directly from the polymer emulsion by increasing the viscosity of the emulsion to a spreadable consistency with the addition of a mixture of toluene and acetone. A suitable tape backing may then be coated with this thickened emulsion and dried under elevated temperature to evaporate the toluene-acetone-water medium and ammonia. Alternatively, a solution of the polymer may be prepared directly from the dispersion by phase inversion from the aqueous phase to an organic solvent phase and a tape made by solvent spreading, as set forth in Example 2.

EXAMPLE 2

The polymer dispersion of Example 1 was poured into a vessel containing 520 gms. of toluene, 37 gms. of concentrated hydrochloric acid and 1 gm. ethylenediamine tetracetic acid. Inversion of the polymer from the aqueous phase to the toluene phase is very rapid. After about 0.5 to 1 hr. of stirring, the mixture was permitted to stand and separate into two layers. The aqueous phase was removed. The resulting polymer solution of approximately 30% solids may then be spread upon a suitable tape backing and heated to dryness to produce a pressure-sensitive adhesive tape.

EXAMPLE 3

The monomers in the amounts of Example 1 were polymerized in an aqueous emulsion of 360 gms. of water containing 4.0 gms. of sodium hydroxide solution to neutralize 50% of the amic acid, 4 gms. of hydrogen peroxide (3% solution in water) and 0.4 gm. ammonium persulfate. The pH of the emulsion was 7.5. The polymerization was conducted in the manner set forth in Example 1 at a temperature of from 10.2° to 23.9° C. The reductant of 0.04 gm. ferrous ammonium sulfate and 0.6 gm. ascorbic acid dissolved in 20 gms. of water was added dropwise to the emulsion. The polymer emulsion was very stable and bluish-white. The polymer may be coagulated from the dispersion by the addition of acid to the emulsion.

The following example illustrates the applicability of the process to the preparation of a polymer of a major proportion of the essential ester and carboxylic acid monomers and a minor proportion of acrylic acid.

EXAMPLE 4

Polymerization recipe:                            Parts, gms.
  (1) Distilled water _____  200
  (2) Dimethylethanolamine _____  11.93
  (3) N-t-$C_{12}$ maleamic acid _____  28.9
  (4) Ethyl acrylate _____  10.0
  (5) 2-ethylhexyl acrylate _____  73.6
  (6) Acrylic acid _____   5.63
  (7) Hydrogen peroxide (3%) _____   2.0
  (8) Ammonium persulfate _____   0.2
  (9) Ferrous ammonium sulfate _____   0.004
  (10) Ascorbic acid _____   0.06
  (11) Sodium bisulfite _____   0.06

The water and the dimethylethanolamine were combined with the monomers and vigorously stirred. The pH of the resulting emulsion was about 7.5. The amount of the dimethylethanol amine base was sufficient to neutralize all of the acrylic acid and 55% of the amic acid. The monomer emulsion was cooled to about 10° C. and the hydrogen peroxide and the persulfate initiator added, followed by the addition of the sodium bisulfite and 10–20 drops of the reductant dissolved in 20 gms. of water. The maximum temperature reached was 27° C. After the exotherm subsided the remainder of the reductant was added. The dimethylethanol amine carboxylate salt groupings of the polymer may be neutralized with acid to coagulate the polymer. Alternatively, the polymer may be heated to cause the base to evaporate therefrom. The amic acid:acrylate:acrylic acid polymer is a pressure-sensitive adhesive polymer.

EXAMPLE 5

Polymerization recipe:                                   Parts, gm.
  (1) Distilled water _____ 175
  (2) Concentrated ammonium hydroxide ____ 2.7
  (3) N-t-$C_{22}$ maleamic acid _____ 20.7
  (4) Ethyl acrylate _____ 10.0
  (5) 2-ethylhexyl acrylate _____ 73.6
  (6) Hydrogen peroxide _____ 2.0
  (7) Ammonium persulfate _____ 0.28
  (8) Ferrous ammonium sulfate _____ 0.007
  (9) Ascorbic acid _____ 0.09

The N-t-$C_{22}$ maleamic acid is a mixture of maleamic acids prepared by the amidation of the maleic hydride with a complex mixture of amines marketed as Primene-JMT by Rohm and Haas Company and reported to be t-alkyl primary amines having highly branched alkyl groups composed of about 80% alkyl amines averaging from 18–21 carbon atoms, 15% averaging greater than 22 carbon atoms and 5% averaging less than 10 carbon atoms. The neutral equivalent of this mixture of amines is 315, corresponding to an alkyl amine having an average alkyl group of about 12 carbon atoms. The molecular weight of this mixture is principally 269–315.

The polymerization procedure followed was substantially that as set forth in Example 3. The temperature of the reaction mixture ranged from 9.7 to 30.3° C. The amount of ammonium hydroxide employed in this example was sufficient to neutralize approximately 90% of the maleamic acid. The polymer, accordingly, was an ammonium maleamate salt: maleamic acid:ethyl acrylate:ethylhexyl acrylate polymer. It is not necessary to convert all of the salt groupings in the polymer to the free carboxylic acid for use as a pressure-sensitive adhesive.

EXAMPLE 6

A N-t-$C_9$ maleamic acid:ethyl acrylate:ethylhexyl acrylate polymer was prepared following the procedure described in Example 1. The N-t-$C_9$ maleamic acid was prepared by amidating maleic anhydride with a mixture of N-t-alkyl amines marketed by the same supplier of the Primene materials. This amine mixture consists principally of branched N-t-$C_9H_{19}$ and N-t-$C_{10}H_{21}$ amines.

The N-t-$C_9$ maleamic acid and the acrylate monomers were added to the reaction vessel in the molar proportions of 1:1:4, respectively. Dimethylethanol amine base in a molar equivalent to the N-t-$C_9$ maleamic acid was used instead of the ammonium hydroxide base. The pH of the monomer emulsion was 7.5. The polymerization proceeded smoothly, but the polymer dispersion was relatively unstable. The polymer is useful as a pressure-sensitive adhesive.

EXAMPLE 7

Polymerization recipe:                                   Parts, gms.
  (1) Distilled water _____ 205
  (2) Concentrated ammonium hydroxide ____ 2.97
  (3) Tridecyl acid maleate _____ 29.8
  (4) Ethyl acrylate _____ 10.0
  (5) 2-ethylhexyl acrylate _____ 73.6
  (6) Hydrogen peroxide (3%) _____ 2.0
  (7) Ammonium persulfate _____ 0.40
  (8) Ferrous ammonium sulfate _____ 0.006
  (9) Ascorbic acid _____ 0.09
  (10) Sodium bisulfite _____ 0.21

Tridecyl acid maleate is a mixture of esters prepared from maleic anhydride and tridecyl oxo alcohol. This alcohol is a mixture of alcohols produced by the oxo process and contains mainly tetramethylnonanols. As with other higher oxo alcohols, there are no isomers with a quaternary carbon atom.

The procedure was as set forth in Example 3 in which all of the peroxide was added and 0.35 gm. of the persulfate was added initially to the monomer emulsion, with the remainder of the persulfate added after the exotherm had subsided. The pH of the monomer emulsion was 6.0. The temperature of the reaction mixture ranged from 6.0° to 29° C.

The amount of the ammonium hydroxide employed corresponds to about 50% neutralization of the acid ester. The polymer emulsion at a pH of less than 7 was stable for about two weeks. In comparison, amic acid copolymer emulsions have remained stable for longer periods at pH's less than 7 even when the percent neutralization is as low as 30%. The polymer is useful as a pressure-sensitive adhesive.

EXAMPLE 8

A polymer was prepared as in Example 7, except that tridecyl acid fumarate was substituted for the maleate ester. The fumarate was prepared by isomerizing tridecyl maleate. The amount of ammonium hydroxide employed was that equivalent to 77% neutralization of the acid maleate. The pH of the monomer emulsion was 7.0 to 7.5. No bisulfite was used. The polymerization was conducted at temperatures of from 9.9° to 30° C. The polymer is useful in the manufacture of pressure-sensitive adhesives.

EXAMPLE 9

Polymerization recipe:                                   Parts, gms.
  (1) Distilled water _____ 200
  (2) Dimethylaminoethanol _____ 17.40
  (3) Tridecyl acid maleate _____ 35.80
  (4) Ethyl acrylate _____ 72.00
  (5) Acrylic acid _____ 5.39
  (6) Hydrogen peroxide (3%) _____ 2.0
  (7) Ammonium persulfate _____ 0.28
  (8) Sodium bisulfite _____ 0.15
  (9) Ferrous ammonium sulfate _____ 0.01
  (10) Ascorbic acid _____ 0.15
  (11) Ethylenediaminetetraacetic acid (EDTA) _____ 0.01

An emulsion of the monomers was prepared as in the case of the preceding example. The monomer emulsion (pH 6.5) was cooled to about 10° C. The hydrogen peroxide, ammonium persulfate and sodium bisulfite was added, followed by the addition of the reductant dissolved in 5 parts water. The EDTA dissolved in 10 parts water was then added. The maximum temperature reached (with cooling) was 49° C. The polymer emulsion was rather viscous and was diluted with water to approximately 28% solids. The polymer emulsion was quite stable.

A sample of the emulsion was coagulated with 6M HCL giving a very tough white polymer.

The polymer was soluble in toluene. The polymer was thermoplastic. A film cast from a toluene solution of the polymer was flexible and clear. It is useful as a heat sensitive adhesive and as a binder for nonwoven fabrics. Pressure-sensitive adhesives may be formulated therefrom by mixing with rubbers, tackifiers and plasticizers.

As indicated above, small amounts of the salt monomer, as little as 5% of the total monomer charge, may be employed in the polymerization of monomers capable of addition polymerization in which the acrylate or methacrylate monomers are present in the monomer charge. This is specifically illustrated in the following example in the case of a third type of pressure-sensitive adhesive polymer disclosed in copending application 386,476. The N-t-C$_{12}$ acrylamide in the example is a mixture of acrylamides prepared by the amidation of acryl chloride with the complex mixtures of t-alkyl primary amines marketed by Rohm and Haas as Primene 81–R.

EXAMPLE 10

The monomer charge in the aqueous emulsion consisted of 21.6 parts N-t-C$_{12}$ acrylamide, 8.8 parts ethyl acrylate, 64.8 parts 2-ethylhexyl acrylate and 4.8 parts of the ammonium salt of N-t-C$_{12}$ maleamic acid on a weight basis. Concentrated ammonium hydroxide in about 25% excess of that necessary to form the salt was added to the reaction mixture. The catalyst system was hydrogen peroxide, ferrous ammonium sulfate, ascorbic acid and ethylenediaminetetracetic acid. The temperature of the reaction mixture ranged from 14 to 28° C.

A stable emulsion of the polymer was obtained. The polymer was coagulated in its free acid form by the addition of hydrochloric acid to a portion of the emulsion in an amount sufficient to neutralize the excess ammonium hydroxide and convert the ammonium salt groupings to carboxylic acid groups. Another portion of the emulsion was heated to about 80° C. and isopropyl alcohol added thereto to coagulate the polymer with carboxyl groups of the amic recurring units in their salt form. Both polymers are pressure-sensitive adhesives.

EXAMPLE 11

The monomer charge in the aqueous emulsion consisted of 20 parts of ethyl acrylate, 147.2 parts of 2-ethylhexyl acrylate and 8.4 parts of the ammonium salt of N-t-C$_{12}$ maleamic acid, on a weight basis. The salt was formed by the reaction of the N-t-C$_{12}$ maleamic acid with ammonium hydroxide in the reaction mixture. The pH of the reaction mixture was 8.8. To the resulting emulsion which formed upon agitation were added hydrogen peroxide, ferrous ammonium sulfate, ascorbic acid and ethylenediaminetetracetic acid. The temperature of the reaction mixture ranged from 15.6° to 29.3° C. The emulsion of the polymer was white and creamy. The polymer is a pressure-sensitive adhesive polymer.

The polymerization catalyst employed in this process are those which act as a source of free radicals and act upon the monomers to initiate polymerization. Various initiating systems or catalyst compositions are known for the polymerization of monomers by addition polymerization in aqueous emulsion systems for various polymerizing conditions. The redox catalyst system has been found suitable and is preferred in this process, such as peroxide and persulfate combinations with a reductant such as ferrous sulfate. Satisfactory results have been obtained with organic peroxides such as t-butyl hydroperoxide, t-butyl peroxymaleic acid and cumene hydroperoxide. It is advisable to also employ a bisulfite reductant in the process of this invention when the pH of the emulsion is less than about 7. The pH of the reaction mixture should not be less than about 5.5–6. Generally, the pH of the reaction mixture preferably should be about 6.5 to 7.5–8. The polymerization reaction is exothermic. The preferred range of operating temperatures is from about 5° to 40° C.

As explained in said pending applications for the pressure-sensitive adhesive polymers disclosed therein, the ester monomer should not constitute more than about 80 parts per 100 parts of total ester and carboxylic acid monomers when the ester monomer is either methyl or ethyl acrylate or mixtures thereof. If the ester monomer is all methacrylate, it should average at least about C$_4$-alkyl methacrylate and should constitute at least about 40% by weight of the total ester and carboxylic acid monomers in the preparation of said adhesive polymers.

The present process is useful in the aqueous emulsion polymerization of monomers capable of addition polymerization to produce polymers in which the aforedescribed ester and carboxylic acid comonomers constitute at least about 50% by weight of the polymer. The process is generally useful in the preparation of copolymers of the alkyl acrylates or methacrylates with other comonomers in addition to those above illustrated, such as esters of acrylic acid, methacrylic acid, maleic acid, fumaric acid, citraconic acid and itaconic acid with polyhydroxy alcohols; amides of said acids with alkyl amines or alkyl polyamines; esters and amides of said acids and amino alcohols; said acids themselves; unsubstituted amides of said acids; imides of the dicarboxylic acids; acrylonitrile; cyanoethylacrylate; dimethylaminoethylmethacrylate; vinyl pyridine; vinyl acetate; and styrene. The minimum relative proportion of the ester and salt comonomers to provide an emulsion for a given system with other comonomers may be determined by simple experimentation, e.g., the other comonomers may be mixed with water and then the ester and salt monomers may be added thereto with agitation of the mixture until emulsification occurs. When the monomer charge includes an acid comonomer such as acrylic acid, maleic acid, etc., as mentioned above, it is essential that sufficient base be present in the reaction mixture to neutralize all of the carboxylic acid groups of such comonomers, in addition to that amount necessary to provide the salt of the amic acid and acid ester comonomers.

The polymer may be coagulated either by converting the salt groupings of the acid and ester comonomeric units to their free carboxylic acid form, or by the addition of a water miscible, organic, liquid polar compound to the polymer dispersion. The conversion from the salt to acid form may be accomplished simply by the addition of an acid to the polymer dispersion. Any acid reactive with the salt grouping to convert it to its free acid form may be employed for this purpose. Hydrochloric acid is preferred simply from the standpoint of cost and convenience. In the instances of salts formed from volatile bases, such as ammonium hydroxide and dimethylethanolamine, the polymer dispersion may be heated to drive off the ammonia or amine to coagulate the polymer. In either case, all or a portion of the salt groupings in the coagulated polymer may be converted to the free acid form. Coagulation of the polymer without conversion of the salt groupings to the free acid form is possible by mixing the polymer dispersion with a water miscible, polar compound. Examples of water miscible, organic, liquid polar compounds are methanol, ethanol, isopropanol butanol, methylethylketone, acetone, acrylonitrile, dimethylformamide, dimethylsulfoxide, methyl formate, ethyl formate and isopropyl acetate.

The invention claimed is:

1. A method of emulsion polymerization comprising the steps of:
   (A) preparing a reaction mixture consisting of (1) water; (2) copolymerizable monomeric constituents consisting essentially of an ester monomeric constituent selected from the group consisting of alkyl acrylate monomers and alkyl methacrylate monomers containing from 1 to 10 carbon atoms in the alkyl groups thereof, respectively, and a carboxylic acid monomeric constituent selected from the group consisting of amic acid monomers having the formula

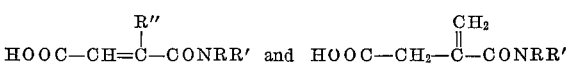

wherein R is alkyl as hereinafter defined, R' is either hydrogen or an alkyl group containing from 1 to 10 carbon atoms and R" is hydrogen or methyl, said carboxylic acid monomeric constituent selected from the groups of said amic acid monomers consisting of (a) an individual amic monomer in which the R alkyl group contains from about 10 to 24 carbon atoms and (b) a mixture of amic acid monomers in which the number of carbon atoms in the R alkyl groups average from about 10 to 24, the amic acids of said mixture being selected from the group consisting of the amic acids containing from 1 to about 28 carbon atoms in the R alkyl groups thereof; (3) a base reactive with the monomers of the carboxylic acid monomeric constituent to form carboxylate salts therewith having hydrophyllic, anionic carboxylate salt groupings thereon, said salts being present with said ester monomers in amounts at least sufficient to emulsify said reaction mixture under agitation; and (4) a polymerization catalyst;

(B) agitating said reaction mixture to form an emulsion of said monomers in the reaction mixture; and (C) maintaining the reaction mixture at a temperature to effect polymerization of the monomers to produce a dispersion of a polymer in which said salt is polymerically combined.

2. A method in accordance with claim 1 wherein an acid is added to said dispersion of the polymer to neutralize said base and convert the carboxylate salt groupings of the polymer to carboxylic acid groups, thereby destroying the dispersion of said polymer.

3. A method in accordance with claim 1 wherein said base is a volatile base and said dispersion of the polymer is heated to evaporate the base thereby destroying said dispersion of the polymer.

4. A method in accordance with claim 3 wherein said base is ammonium hydroxide.

5. A method in accordance with claim 1 wherein said base is sodium hydroxide.

6. A method in accordance with claim 1 wherein said base is potassium hydroxide.

7. A method in accordance with claim 1 wherein said base is an alkyl tertiary amine.

8. A method in accordance with claim 3 wherein said base is dimethylethanol amine.

9. A method in accordance with claim 1 wherein a water immiscible solvent in which said polymer is soluble and an acid to convert the carboxylate salt groupings to carboxylic acid groups are added to said dispersion whereby the polymer is dissolved in said solvent and the aqueous medium is separated from the solution of the polymer.

10. A method in accordance with claim 1 wherein said copolymerizable monomeric constituents in the reaction mixture include an ethylenically unsaturated monomer capable of addition polymerization other than said ester and carboxylic acid monomers and wherein said ester monomer and the salt from the carboxylic acid monomer are present in amount at least sufficient to emulsify the reaction mixture.

11. A method of preparing a pressure-sensitive adhesive polymer in accordance with the emulsion polymerization method of claim 1 wherein said copolymerizable monomeric constituents comprise from about 30 to 95 parts by weight of said ester monomeric constituent and from about 70 to 5 parts by weight of a group (b) mixture of amic acid monomers wherein the amic acids selected which contain more than about 6 carbon atoms in the R alkyl groups consist essentially of amic acids in which the alkyl groups are branched alkyl groups in which the extent of branching increases as the size of said alkyl groups increases and the number of amic acid monomers in the mixture containing dissimilar R alkyl groups increases as the amic acids selected which contain R alkyl groups of more than 10 carbon atoms increases, and said base is present in an amount at least sufficient to form the salt with at least 5 parts by weight of the amic acid monomers.

12. A method in accordance with claim 1 wherein the polymer dispersion is mixed with a water miscible, organic, liquid polar compound to coagulate the polymer.

13. A latex comprising an emulsion consisting of water and a salt of a base and a polymer of copolymerized monomeric constituents consisting essentially of an ester monomeric constituent selected from the group consisting of alkyl acrylate monomers and alkyl methacrylate monomers containing 1 to 10 carbon atoms in the alkyl groups thereof, respectively, and a carboxylic acid monomeric constituent selected from the group consisting of amic acid monomers having the formula

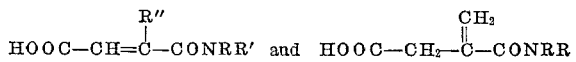

wherein R is alkyl as hereinafter defined, R' is either hydrogen or an alkyl group containing from 1 to 10 carbon atoms and R" is hydrogen or methyl, said carboxylic acid monomeric constituent selected from the groups of said amic acid monomers consisting of (a) an individual amic monomer in which the R alkyl group contains from about 10 to 24 carbon atoms and (b) a mixture of amic acid monomers in which the number of carbon atoms in the R alkyl groups average from about 10 to 24, the amic acids of said mixture being selected from the group consisting of the amic acids containing from 1 to about 28 carbon atoms in the R alkyl groups thereof, said base being reactive with the carboxylic acid groups of the polymer to form carboxylate salt groupings in the polymer.

References Cited

UNITED STATES PATENTS

| | | |
|---|---|---|
| 2,533,204 | 12/1950 | Caldwell. |
| 2,643,245 | 6/1953 | Wilson _____ 260—78.5 |
| 2,939,855 | 6/1960 | Bartl et al. |
| 3,299,010 | 1/1967 | Samow _____ 260—80.72 |

FOREIGN PATENTS 1,391,744  2/1965  France.

MURRAY TILLMAN, Primary Examiner

W. J. BRIGGS, Assistant Examiner

U.S. Cl. X.R.

117—122; 156—331, 332; 260—78, 78.5, 80.8, 80.73, 80.81, 86.1